Jan. 24, 1967        A. L. GOOD        3,300,005
POWER TRANSMISSION APPARATUS
Original Filed Oct. 2, 1964        4 Sheets-Sheet 2

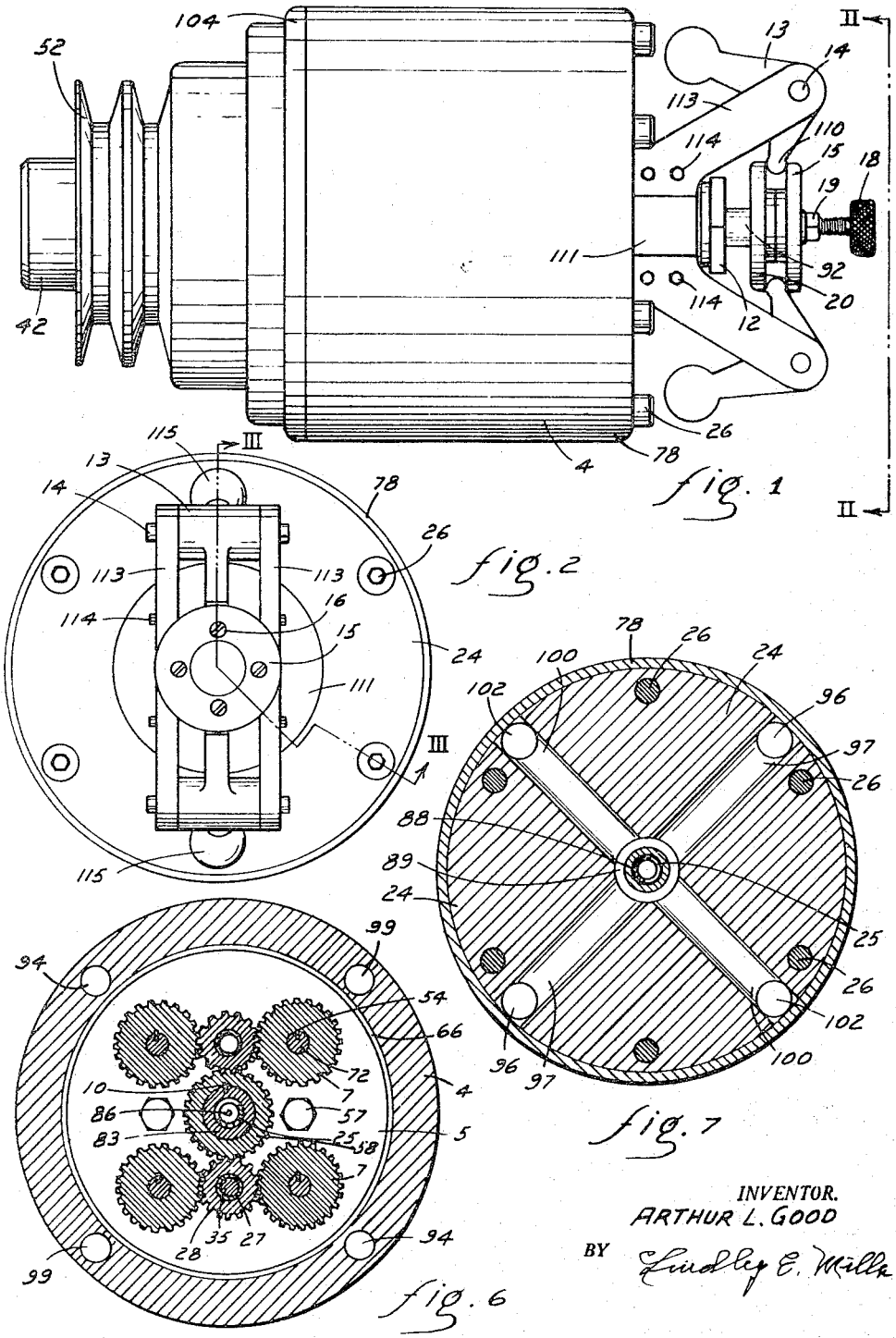

INVENTOR.
ARTHUR L. GOOD
BY

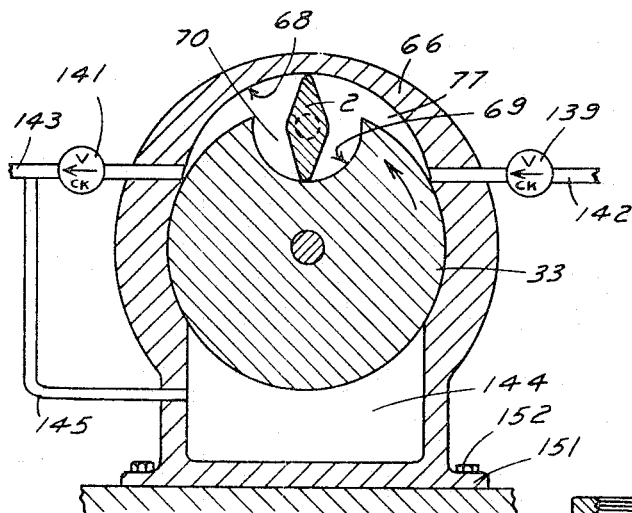
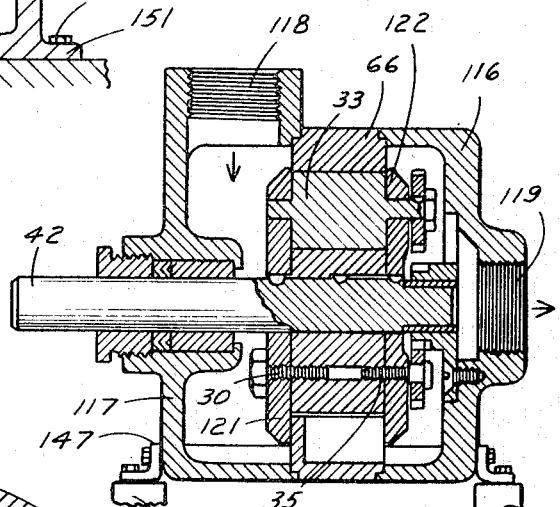
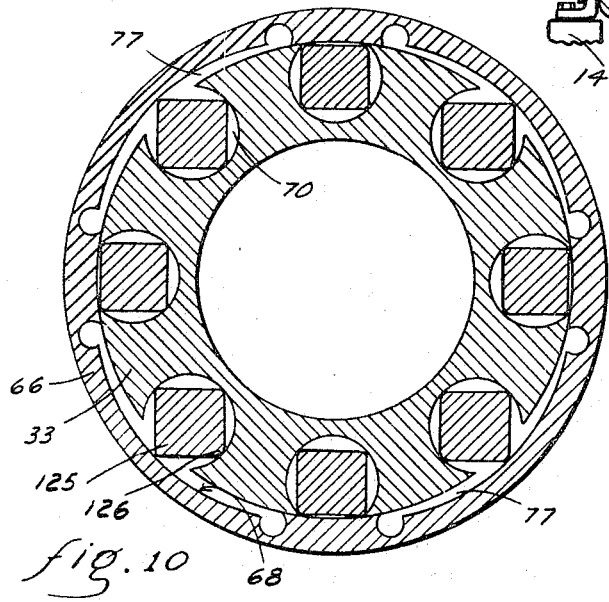

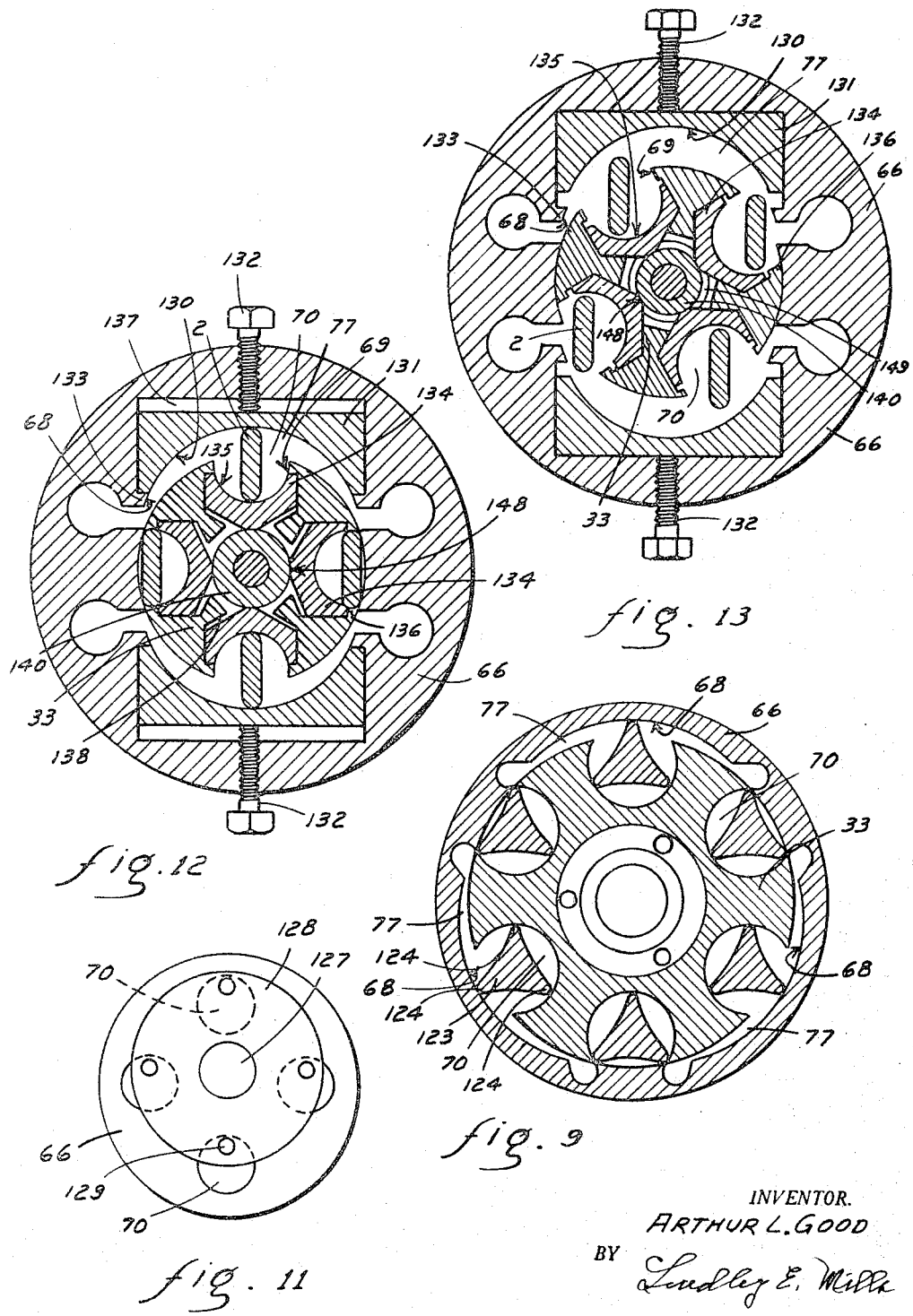

United States Patent Office 3,300,005
Patented Jan. 24, 1967

3,300,005
POWER TRANSMISSION APPARATUS
Arthur L. Good, 1549 Cone St., Elkhart, Ind. 62634
Original application Oct. 2, 1964, Ser. No. 401,074, now Patent No. 3,251,443, dated May 17, 1966. Divided and this application Jan. 3, 1966, Ser. No. 535,627
7 Claims. (Cl. 192—61)

This invention relates to a fluid power apparatus, or device, particularly to apparatus involving the circulation of a fluid therein to produce certain effects which will be described. This application is a continuation-in-part of application Serial No. 270,734, filed April 4, 1963, now abandoned, and a division of application Serial No. 401,074, now U.S. Patent No. 3,251,443.

Devices of various sorts have been described and used widely by means of which a fluid is forced through a circuitous path to accomplish one of many effects. Such effects include the operation of machinery, the transport of fluids from one place to another, and the like. In such cases power is applied in a suitable way to the apparatus. On the other hand it is frequently the practice to provide apparatus through which a fluid under pressure is forced and from which power can be taken off.

Devices of the kinds referred to have heretofore consisted of certain conventional assemblages of parts. One such assemblage is the well known gear pump in which a pair of meshing gears, each rotating in a closely fitting chamber, can be employed, when power driven, to forward a fluid through the pump to an external circuitous path to accomplish a desired effect or to pump the fluid from one location to another. By omitting the power source to drive the gears and by forcing fluid through the apparatus under pressure the gears are rotated and power can be taken off from the apparatus by a suitable means.

Another common device is the well known vane pump in which a cylindrical member rotates nonconcentrically in a cylindrical chamber of larger diameter than the member and in which the circular member is provided with a vane reciprocating in an essentially radial slot in the member, the outer end of the vane being adapted to wipe the inner surface of the cylindrical chamber. By suitably locating the parts and by providing suitable ports through which the fluid can enter and leave the part of the chamber not occupied by the cylindrical member, the apparatus can be used to pump fluid under considerable pressure either to transfer the fluid or to operate a suitable machine. On the other hand, when a fluid is forced through a suitable modification of the apparatus, power can be taken off from it. In some instances the member and chamber are not entirely cylindrical.

In the foregoing and other equivalent devices a fluid is displaced by the apparatus when the apparatus is power driven and the fluid is forwarded to a desired location. Such devices are sometimes referred to as "fluid displacement devices." In apparatus of the foregoing and equivalent kinds through which fluid is forced under pressure, e.g. from an outside source, and from which power is taken off, the fluid circulating through the apparatus displaces elements of the apparatus. Such devices are sometimes referred to as "fluid motors."

These and other conventional devices although employed widely are inefficient and tend to become noisy and are limited in many known ways which detract from their desirability. Although other types of devices of the general kind mentioned have been proposed, and in some instances used to a considerable extent, they each have disadvantages and are often unreliable, inefficient, and in certain instances not adapted to high speed use. Furthermore, they are invariably costly to manufacture and generally require frequent and extensive servicing. In addition, such devices are not generally well adapted to use as variable speed power transmitting devices which in many operations is essential.

The present invention is concerned with apparatus which can, by suitable modification, function in some instances as a fluid displacement device, in some instances as a fluid motor, in some instances either as a fluid displacement device or as a fluid motor and in still other instances essentially as both a fluid displacement device and a fluid motor at the same time with power being applied to one part of the apparatus and power being taken off from another part of the apparatus.

For want of a better term, the term "fluid power apparatus" is used herein to include apparatus through which a fluid circulates and suitable modifications of which are adapted to use as (1) a fluid displacement device, (2) a fluid motor, (3) either a fluid displacement device or a fluid motor, and (4) a variable speed power transmitting device wherein one part of the apparatus is power driven and power is taken off from another part of the same apparatus. In the latter instance the path of the circulating fluid can lie wholly within the fluid power apparatus or partially within and partially outside the apparatus.

It is, therefore, an object of the present invention to provide a fluid power apparatus by means of which fluid can be circulated to accomplish a desired effect.

An additional object is to provide a fluid power apparatus useful for forwarding a fluid under pressure to deliver power to a desired machine or location.

An additional object is to provide a fluid power apparatus free of gears and reciprocating vanes which function as fluid-forwarding elements.

An additional object is to provide a fluid power apparatus useful as a fluid displacement device.

An additional object is to provide a fluid power apparatus useful as a fluid motor.

An additional object is to provide a fluid power apparatus useful either as a fluid displacement device or as a fluid motor.

An additonal object is to provide a fluid power apparatus useful as a power transmitting device.

An additional object is to provide a fluid power apparatus useful as a variable speed power transmitting device which is highly efficient in the transmission of power and which is adjustable to a predetermined speed of the power take off.

An additional object is to provide a fluid power apparatus useful as a variable speed power transmitting device which is economical to manufacture and which is rugged in operation and requires infrequent servicing.

An additional object is to provide a fluid power apparatus useful as a variable speed power transmitting device adapted to apply a low starting torque for heavy loads and to maintain an essentially constant speed once the desired speed has been attained.

An additional object is to provide a fluid power apparatus useful as a variable speed power transmitting device which can be installed in place of a conventional pulley or gear on the end of a driven shaft.

Other advantages of the inventions will be apparent as the description proceeds.

Although the term "fluid" includes both liquids and gases, it is often the case that apparatus of this invention is concerned with liquids rather than with gases and to this extent, the apparatus is an hydraulic apparatus. However, it will be apparent from the description that in most instances the apparatus of this invention can be used with gases as well as with liquids, even though the employment of hydraulic liquids may be preferred. Although the apparatus will, therefore, be described with particular reference to its use with liquids, especially in the description of its use as a variable speed power transmitting device, it is to be understood that the invention encompasses also that operation of the apparatus with gases in instances where such use is advantageous or appropriate.

Generally speaking, the fluid power apparatus of this invention comprises "first" and "second" assemblages of members which cooperate with one another in the way which will be described. Generally speaking, also, it will be apparent that when the apparatus is power driven, power can often be applied to either the first or the second assemblage, as desired, and that the apparatus is reversible so that fluid can be caused to flow through it in either direction.

Since one important application of the apparatus is as a variable speed power transmitting device, the invention will be described first, and with particular emphasis, with respect to its employment for that purpose. In such instance one of the assemblages is power driven and power is taken off from the other assemblage. For the sake of clarity in describing this modification of the invention, the assemblage to which a power input source can be connected will be assumed to be the first assemblage and, since it serves to drive the second assemblage, the first assemblage will, for the sake of further clarity, frequently be referred to as the "driving assemblage." In similar manner the second assemblage, which is driven by the driving assemblage and from which power can be taken off will frequently be referred to as the "driven assemblage."

In any modification the first and second assemblages rotate coaxially with one another and cooperating with one another in the way which will be described.

Briefly, the first assemblage includes one or more rotor vane cavities, or chambers, in each of which a suitable vane provided with a plurality of rotor vane tips, usually referred to as a "rotor vane," rotates, generally with a tip in essentially fluid-tight relationship with the wall thereof. The second assemblage includes a fluid-forwarding chamber, one surface of which is wiped by a rotor vane tip, generally in essentially fluid-tight relationship with the wall thereof, the rotor vane chamber and the fluid-forwarding chamber being alternately in communication with and noncommunicating with one another. Suitable "first" and "second" fluid-conveying duct systems located in the second assemblage serve to convey fluid, by way of corresponding "first" and "second" ports into and out of, respectively, the fluid-forwarding chamber. When the apparatus is to be employed for forcibly forwarding a fluid, one of the assemblage, e.g. the first assemblage, is power driven. When the apparatus is to be employed as a fluid motor, fluid is circulated forcibly through the fluid-forwarding chamber to effect rotation of at least one of the assemblages.

In the event the fluid is to be delivered by the apparatus to a suitable receiver or machine located externally of the apparatus, one duct system, i.e. the second duct system in the second assemblage, is connected with a suitable conduit for delivering the fluid to the desired location and another appropriate fluid-conveying duct system, i.e. the first duct system in the second assemblage, is connected with a suitable conduit for conveying a supply of fluid to the apparatus. In the event the apparatus is utilized to forward fluid under pressure to operate another device or machine, it generally follows that the exhaust fluid from the operated device or machine can be conveyed back to the fluid power apparatus and recirculated.

When the fluid power apparatus is used to deliver fluid to a location external to the apparatus, one of the assemblages is usually mounted rigidly and prevented from rotating to facilitate the connection of suitable conduits to it, power being in this instance applied to the other assemblage. When, however, a suitable modification of the fluid power apparatus is utilized as a variable speed power transmitting device, it is convenient to connect the first and second duct systems together within the second assemblage to provide a continuous closed path for flow of fluid out of and into the fluid-forwarding chambers. Power can then be applied to rotate one of the assemblages and power can be taken off from the other assemblage. By installing a suitable fluid flow-restricting means in the path of the flow of fluid within the second assemblage, rotatiton of both the first and second assemblages can be effected by driving one of the assemblages, e.g. the first assemblage, the relative rotational speed of the second, or driven, assemblage with respect to that of the first or driving assemblage depending upon the degree of restriction of fluid flow by the flow-restricting means. By making the degree of fluid restriction responsive to the actual speed of rotation of the driven assemblage, power can be taken off from the driven assemblage at an essentially constant rotational speed. These matters will be clear as the description proceeds.

The invention can be understood readily by reference to the accompanying drawing wherein, in the interest of clarity, certain features are shown on a somewhat exaggerated scale and wherein:

FIGURE 1 is an elevation, somewhat schematic, of a variable speed power transmitting device embodying features of the invention;

FIGURE 2 is an end elevation taken along the line II—II of FIGURE 1;

FIGURE 6 is a sectional elevation taken along the line VI—VI of FIGURE 3 showing the relationships of certain of the parts with respect to one another;

FIGURE 7 is a sectional elevation taken along the line VII—VII of FIGURE 3 showing the relationships of certain others of the parts with respect to one another;

FIGURE 8 is a view, principally in section, illustrating certain features of one modification of the apparatus of the invention useful as a reversible pump for fluids;

FIGURE 9 is a schematic sectional illustration showing certain features of yet another modification of the apparatus of the invention;

FIGURE 10 is a schematic sectional illustration showing certain features of still another modification of the apparatus of the invention;

FIGURE 11 is a diagrammatic illustration showing certain features of a modification of the apparatus of the invention employing a cam arrangement in place of gears;

FIGURE 12 is a schematic sectional illustration showing certain features of another modification of the apparatus of the invention;

FIGURE 13 is a schematic sectional illustration corresponding to FIGURE 12, but showing different positions of certain of the parts; and FIGURE 14 is a diagrammatic illustration of a modification of the apparatus of the invention useful for producing a pulsed flow of fluid.

As indicated previously the apparatus of the invention will be described first, and in greatest detail, with reference to a modification adapted particularly to use as a variable speed power transmitting device as illustrated in FIGURES 1–7, inclusive. An hydraulic liquid is preferably employed as the circulating fluid in this instance.

Figure 3:
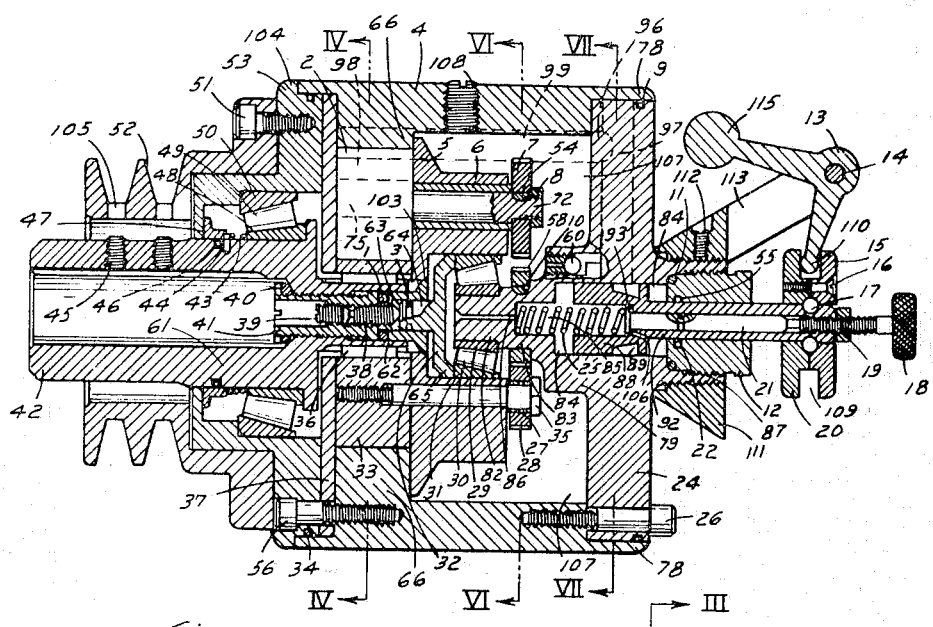
FIGURE 3 is an elevation, principally in section, of the device of FIGURES 1 and 2 taken along the broken line III—III of FIGURE 2 and, correspondingly, along the broken line III—III of FIGURE 4.

Referring to FIGURES 1 and 3, the variable speed power transmitting device illustrated includes a shaft coupling 42 of appropriate internal diameter to accommodate the end of a driven power shaft (not shown) and with suitable means, such as key lock screws 45, to secure the coupling in conventional fashion on the end of the shaft. The shaft coupling 42, is suitably contoured externally along an intermediate section 61 of its length inwardly of the apparatus to provide a seat for a main or outer bearing, suitably a seat for the inner race 48 of a roller bearing 49. The disposition of the outer race 50 of the bearing 49 will be referred to later. The coupling 42 is prolonged inwardly of the intermediate section 61 and is suitably of reduced outer diameter along its inner end section 62. The inner end section 62 is bored axially and threaded internally to accommodate an externally threaded rotor adjusting screw 41 which is locked at its outer end, as by a lock nut 40. The bore of the inner end section 62 of the coupling 42 is conveniently of lesser diameter than the bore of the outer and intermediate end sections of the coupling. The configuration and function of the inner end of the rotor adjusting screw will be mentioned later.

The rotor adjusting screw 41 is bored axially and threaded internally to accommodate a bearing adjusting screw 38 and a lock screw 39 therefor. An unthreaded and suitably somewhat larger inner section 63 of the inner end of the bore of the rotor adjusting screw 41 accommodates the protruding center shaft 64 of a suitably dish-shaped bearing adjusting plate 32. The rim 65 of the bearing adjusting plate 32 bears on the outer race 31 of an inner bearing 30, the disposition and functioning of which will be referred to later. The outer end of the bearing adjusting plate shaft 64 bears against the inner end of the bearing adjusting screw 38 by means of which the location of the plate 32 can be adjusted. Suitable seals, such as a rotor adjustment seal 1 and a bearing adjustment seal 3, are conveniently provided to prevent passage of hydraulic fluid outwardly of the apparatus around the rotor adjusting screw 41 and around the bearing adjusting plate shaft 64, respectively.

A rotor 33 is provided which is of generally cylindrical exterior configuration with planar end faces and is bored axially and secured, as by keys 36 and suitable keyways, to the outer surface of the inner end section 62 of the coupling 42 so as to rotate therewith. A rotor frame 5, also of generally cylindrical exterior configuration with a diameter somewhat greater than that of the rotor, is mounted with its planar outer end face in flat face to face nonrotational contact with the inner end face of the rotor 33. The rotor frame is bored axially, a short length of the bore adjacent to the rotor having a diameter approximately the same as or somewhat larger than, that of the bore of the inner end section 62 of the coupling 42. The inner end of the short length of the rotor bore is enlarged, e.g. flared outwardly, to accommodate the correspondingly enlarged and contoured inner end, or head, 103 of the rotor adjusting screw 41. By turning down the screw 41 and tightening the lock nut 40 the rotor frame is secured against the inner end of the rotor 33, although additional securing means is provided as will be mentioned later.

Figure 4:
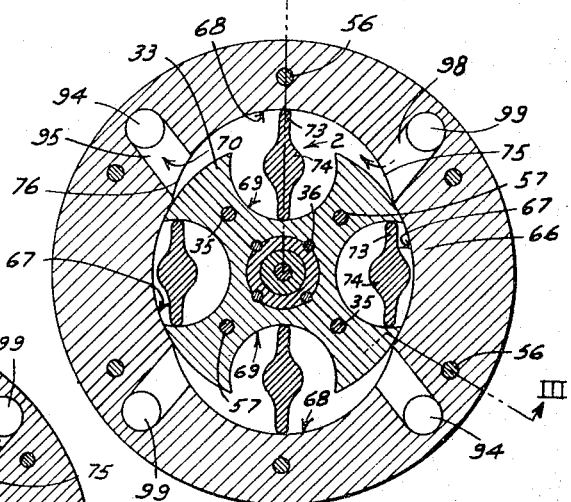
FIGURE 4 is a sectional elevation taken along the line IV—IV of FIGURE 3 showing the relative positions of certain of the parts at one stage in the operation of the device.
Figure 5:
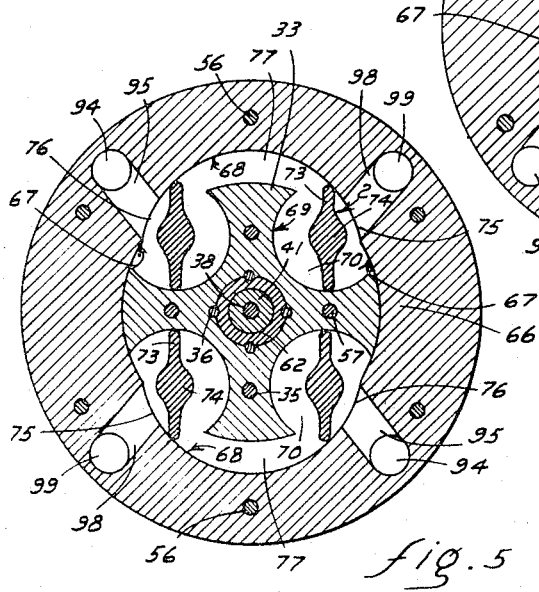
FIGURE 5 is a sectional elevation corresponding to FIGURE 4, but showing the relative positions of certain of the parts at a different stage in the operation of the device.

As is shown in FIGURES 4 and 5, and as will be explained in detail later, the rotor 33 in the modification illustrated is provided with four vane cavities or chambers 70 spaced equally around its periphery. A rotor vane 2 is located rotatably in each vane chamber. Each vane unit comprises a rotor vane shaft 72 extending axially from one side of the vane through an appropriately located bore and rotor vane bearing 6 in the rotor frame 5. The outer end of the rotor vane shaft 72 is threaded to receive a rotor vane nut 8. A rotor vane gear 7 is secured, as by a rotor gear key 54, to the shaft between the nut 8 and the adjacent face of the rotor frame 5.

The rotor 33 and the rotor frame 5 are also provided with registering holes to receive a pair of oppositely located idler gear bolts 35, the holes in the rotor being threaded internally and being located between the vane chambers 70. The bolts 35 are each provided near their heads with a section of enlarged diameter providing a shoulder to bear against the rotor frame when the bolts are tightened down to assist in securing the rotor 33 and the rotor frame 5 securely together. The enlarged section of each bolt also provides for the mounting, by way of a suitable bearing 27, of an idler gear which runs freely on the bolt. A pair of securing bolts 57, shown particularly in FIGURE 6, are provided, usually on the same radius as, and spaced equally between, the pair of idler gear bolts 35, to further assist in securing the rotor 33 and the rotor frame 5 together. The axial bore of the rotor frame 5, except for the short length facing the shaft coupling 42 referred to, is sufficiently large to enclose the bearing adjusting plate 32 and to provide a seat for the outer race 31 of the inner bearing 30.

It will be seen from the foregoing that the assemblage of the elements comprising the shaft coupling 42, the inner race 48 of the bearing 49, the rotor 33, the rotor vanes 2, the rotor frame 5, the bearing adjusting plate 32, the outer race 31 of the bearing 30 and associated parts rotates as unitary assemblage. As indicated previously, this unitary assemblage can be referred to conveniently as the "driving assemblage" of the apparatus.

The driven assemblage will now be described.

A rotor housing 4 of suitable dimensions is provided which is of generally cylindrical configuration. The rotor housing can be provided with external fins for cooling if desired. The inner contour of the rotor housing will be described later. The end face of the rotor housing nearest the main bearing 49 is recessed to receive a circular wear plate 37 and the adjacent part of a main bearing housing 53, a suitable bearing housing seal 34 being inserted between the projecting rim of the rotor housing 4 and the inset part of the main bearing housing 53 to prevent the passage of hydraulic fluid outwardly between them. The main bearing housing 53 is provided with a circumferential flange 104, which bears against the extreme end of the rotor housing 4 to position these elements accurately with respect to one another.

The circumferential inner face of the main bearing housing 53 is planar and is adapted to bear on wear plate 37 in flat face to face relationship. The parts are dimensioned to cause the plane of the circumferential inner face of the housing 53, but when the housing is properly seated, to clear by a suitable distance all but the inner end section 62 of the shaft coupling 42. The wear plate 37 is bored axially to enable it to be slipped over the inner section 62 of the coupling 42, suitably without bearing thereon. The rotor housing 4, the wear plate 37 and the main bearing housing 53 are secured together by suitable main bearing housing screws 56, the wear plate 37 being provided with suitable ports through which the screws can pass with the plate thus being clamped between the housing 53 and the housing 4. Suitable gaskets, not shown, are preferably located under the heads of the screws 56 to prevent leakage of fluid out of the apparatus around them.

The main bearing housing 53 is bored axially, the bore being adapted to provide a seat for the outer race 50 of the main bearing 49. The extreme outer end of the bore of the main bearing housing 53 is dimensioned to fit rotatably the outer surface of the shaft coupling 42 which, as will be apparent later, turns in the bore. Suitable means, such as a seal plate 47, a seal plate tensioning spring 43, a seal plate torque pin 44 and a seal plate seal 46, are provided to prevent leakage of hydraulic fluid outwardly of the apparatus between the housing 53 and the coupling 42. A suitable power take-off means, such as a belt pulley 52, or a sprocket for a chain drive, is secured, as by pulley screws 51, to the outer face of the housing 53, so as to rotate therewith around the coupling 42. In the modification illustrated, suitable holes 105 are provided in the bottom of the pulley ways which turn into register with the lockscrews 45 and through which the latter can be tightened, e.g. by means of a set screw wrench or a screw driver.

The rotor housing 4 is of generally cylindrical interior configuration leaving a suitably thick wall except that the end of the housing nearest the shaft coupling is provided with an apertured member, or end plate, 66, preferably formed as an integral part of the housing, which has a length, longitudinally of the housing, equal to that of the rotor 33. The character of the aperture in the plate 66 will be apparent from an inspection of FIGURES 4 and 5 and will be referred to later. Here it will be noted only that the aperture is defined, in part, by a pair of opposite arcuate surfaces 67 each of which in the assembled apparatus, is concentric with the longitudinal axis of the shaft coupling 42. Each of the surfaces 67 is formed on a radius substantially the same as the radius of the outer surface of the rotor 33 so as to contact the latter surface in sliding essentially liquid tight relationship. The surfaces 67 have their centers diametrically opposite one another and extend through suitable equal arcs, e.g. by way of example only, through arcs of roughly 65 to 75 degrees. The surfaces 67, can, for convenience, be referred to as "concentric arcuate surfaces."

An element of the driven assemblage comprises a second end plate 24 which closes the end of the rotor housing 4, opposite the shaft coupling 42. This end plate is usually inset into the end of the wall of the rotor housing so as to be surrounded entirely by a flanged extension 78 of the rotor housing. The end plate 24 is secured in place by suitable end plate screws, or bolts 26, and a suitable gasket or seal 9 is provided between the flange and the end plate to prevent leakage of fluid outwardly of the apparatus. Suitable gaskets, not shown, are located under the heads of the screws 26 to prevent leakage of fluid out of the apparatus around the screws. The second end plate is provided with an elongated hub 79 which is located coaxially with the shaft coupling 42. The extreme inner end section 82 of the hub 79 is reduced in outer diameter and is adapted to seat on the inner race 29 of the second bearing 30 referred to previously. An intermediate gear seat section 83 of the hub 79 of somewhat greater external diameter than the section 82 is adapted to receive an end plate gear 58, to be referred to later, which is secured in place as by an end plate gear key 10.

The end plate hub 79 is bored axially from its outer end to provide a valve plug chamber 87, a valve chamber 84 of lesser internal diameter than the chamber 87, a valve spring chamber 85 of lesser internal diameter than the chamber 84 and a bleeder duct 86 of smaller diameter than the chamber 85 which opens through the inner end of the hub. The valve comprises a valve body 88 of cylindrical exterior contour adapted to slide snugly longitudinally in the valve chamber 84. One end of the valve body, suitably its outer end, is provided with an encircling fluid-conducting channel 89 through which fluid can flow around the body. The valve body 88 is secured to, or is integral with, an elongated valve stem 92 which extends outwardly beyond the valve plug chamber 87. A suitable externally threaded valve plug 12 bored to receive the valve stem 92 slidably, is seated in the internally threaded valve plug chamber 87 to maintain the alignment of the valve stem. Suitable seals 11 and 22 are conveniently provided to prevent leakage of hydraulic liquid outwardly of the apparatus between the valve plug and the wall of the valve plug chamber and between the valve plug and the valve stem, respectively.

The valve body is bored axially from its inner end to receive a suitable valve spring 25, the other end of the spring being seated in the valve spring chamber 85. Normally the valve spring 25 is under compression and is conveniently a coil spring. The valve stem is also bored axially and is threaded internally near its outer end to receive an externally threaded valve adusting screw 18. The screw 18 bears at its inner end on a valve adjusting pin 21 and leakage of fluid outward around the pin 21 is prevented by a suitable valve pin seal 55. The inner end of the pin 21 is provided with a pin plate 93 to bear on the end of the spring 25. It will thus be seen that, by adjusting the screw 18, the position of the plate 93 with respect to the valve body 88 is adjusted inwardly or outwardly and the tension on the spring 25 is increased or decreased accordingly. A suitable lock nut 19 can be provided to secure the adjusting screw 18 against inadvertent manipulation. The driven assemblage thus comprises the rotor housing 4, including the apertured member 66, the second end plate 24 and integral hub 79 and the associated parts, together with other associated parts which will be referred to.

The configurations of certain of the parts and the manner of their cooperation will now be described in greater detail.

Intersecting the concentric arcuate surfaces 67 at their ends is another pair of arcuate surfaces 68, shown clearly in FIGURES 4 and 5, which are nonconcentric with the longitudinal axis of the shaft coupling 42, the pairs of surfaces 67 and 68 defining completely the aperture in the end plate 66. The two surfaces 68 have the same length as the two surfaces 67 i.e. all four surfaces extend completely through the apertured member 66. Each of the surfaces 68 is formed so that it is bisected by a radial line common to both extending at an angle of 90 degrees with respect to a line bisecting the two surfaces 67, both lines extending through the prolonged longitudinal axis of the shaft coupling 42. The radii of the two surfaces 68 are located at equal distances from, and on opposite sides of, the longitudinal axis of the shaft coupling 42. The surfaces 68 are, for convenience, referred to as "nonconcentric arcuate surfaces."

The rotor 33, as noted previously, and as is also apparent from FIGURES 4 and 5, is a generally cylindrical element with a radius essentially equal to that of the two concentric arcuate surfaces 67. The rotor is located within the aperture of the apertured member 66 and rotates therein in essentially fluid tight contact with the concentric surfaces 67. It will be observed that the rotor clears the nonconcentric surfaces 68 by a suitable distance leaving a crescent shaped channel, or fluid forwarding chamber, 77 between the rotor and each of the surfaces 68, the function of which will be apparent later. One end of the crescent shaped channel 77 is sealed against leakage of fluid therefrom by the wear plate 37 and the opposite end is similarly sealed by the rotor frame 5 which is of sufficient diameter adjacent to the apertured member to cover completely the aperture therein.

The rotor is cut away from its outer surface to provide four arcuate surfaces 69 extending the length of the rotor 33 with the radial centers of the surfaces being spaced equi-distantly around the rotor and with each lying on a common arc centered on the longitudinal axis of the shaft coupling and having a radius somewhat less than that of the outer surface of the rotor 33. The arcuate surfaces 69 thus extend through arcs of somewhat more than 180 degrees and define open-sided cavities 70 which, for convenience may be referred to as "rotor vane cavities" or "vane rotor chambers."

The valve body 88 which has been described functions to restrict the flow of hydraulic fluid in ducts provided in the driven assemblage of the apparatus. Referring to FIGURES 3, 4, 5 and 7 it will be noted that the wall of the rotor housing 4 is formed, as by drilling longitudinally, to provide a first rotor housing duct 99 extending longitudinally through it. The duct 99 communicates with an inlet, or first, port 75 in the nonconcentric surface 68 by way of an inlet, or first, port duct, or slot, 98 milled longitudinally on the apertured member 66. One end of the duct 99 is closed by the wear plate 37. The opposite end of the duct 99 communicates by way of a short registering end plate duct 96 in the end plate 24 with a main end plate inlet duct 97 drilled radially in the end plate 24. The duct 97 is closed at its outer end by the flange 78 and communicates at its inner end with the valve fluid channel 89 when the valve is adjusted suitably. The relationship of these several ducts, or first fluid-conveying duct system, with one another and with the valve fluid channel 89 is shown in FIGURE 7.

In similar manner the outlet, or second, port 76 of FIGURES 4 and 5 in the same nonconcentric surface 68 communicates by way of an outlet, or second, port duct, or slot, 95 in the apertured member 66 with a second rotor housing duct 99, not shown in FIGURE 3, in the rotor housing. The latter communicates by way of a short registering end plate outlet duct 102 of FIGURE 7 with a radially formed main end plate outlet duct 100 in the end plate 24, these several ducts comprising a second fluid-conveying duct system. Corresponding inlet and outlet duct systems extend between the other nonconcentric surface 68 and the channel 89. It will be apparent that with the valve body 88 in its open position, i.e. at the extreme left in FIGURE 3, hydraulic liquid can flow freely by way of the fluid channel 89 between the systems of inlet and outlet ducts and that with the valve in this position any rotation of the driving assemblage will merely serve to circulate fluid in the systems of ducts without exerting any appreciable force on the driven assemblage tending to cause it to rotate. When, on the other hand, the valve is in its wholly closed position, i.e. at the extreme right in FIGURE 3, the channel 89 is out of register with the ducts 97 and 100 and fluid is prevented in positive fashion from flowing between the inlet and outlet ducts. Under such conditions the driving and driven assemblages become locked together and any rotation of the driving assemblage will cause an equal angular rotation of the driven assemblage. For intermediate positions of the valve body 88, the flow of fluid through the fluid channel 89 will be restricted accordingly, but not prevented, and rotation of the driving assemblage will cause rotation of the driven assemblage, but at a rate less than that of the driving assemblage in proportion to the degree to which the flow of fluid is restricted. The inlet and outlet ports are, for best results, located at the extreme ends of the nonconcentric arcuate surfaces 68 and can, if desired, be located so that they are partly, preferably to a minor extent, in the concentric arcuate surfaces 67.

As noted previously, four rotor vanes 2 are provided with each vane being located in a corresponding vane cavity in the rotor 33. Each vane is integral with a rotor vane shaft 72 which is mounted in a suitable rotor vane bearing 6 extending through the rotor frame 5. The longitudinal axis of the shaft is co-extensive with the radial center line of the corresponding vane cavity. Each rotor vane is formed with a pair of opposed wings 73 and, as a matter of convenience, is formed with an enlarged, roughly cylindrical hub 74 which is, in effect, an extension of the shaft 72. Each wing of each vane is of suitable thickness to provide the required strength and rigidity and is contoured at its outer end as a semi-cyclindrical surface, or vane tip, having a radius which is, for convenience, referred to as a "vane tip radius," which will be referred to later, and which is generally equal to one half the thickness of the vane adjacent to the semi-cyclindrical surface. The extreme length of each vane from the center of one semi-cylindrical vane tip surface to the other is twice the radius of the arcuate surfaces 69. Thus when a vane rotates about its axis of rotation within its vane cavity first one tip and then the other wipes the surfaces 69 in essentially fluid-tight relationship.

It is pointed out, further, that the four rotor vanes 2 are mounted and controlled as to their rotation, in a way which will be explained later, so that each extends at all times parallel, as determined by a line passing through its vane tip radii, with a radial line common to both the nonconcentric surfaces 68 and passing through the common axis of rotation of the rotor 33, and of the apertured member 66. With a proper dimensioning of the parts, it will be apparent, as shown clearly in FIGURES 4 and 5, that, as either the apertured member 66 or the rotor 33 rotates with respect to the other, one tip of each vane will wipe a nonconcentric surface 68 in fluid-tight relationship while the other tip of the vane is wiping the arcuate surface 69 in the same way. Thus, assuming the rotor 33 in FIGURE 5 to be rotating in a counter clockwise direction and with an inlet port 75 for hydraulic fluid being provided at the end of a nonconcentric arcuate surface 68 first contacted by a vane, as shown, a certain volume of hydraulic fluid will be trapped in the space comprising the channel 77 and the portions of the vane cavities 70 lying between the vane which has just passed the inlet port and the vane next ahead of it. This body of fluid will be transported along with the rotor and rotor vanes until the forward vane clears the edge of an outlet port 76, which is provided at the end of the same nonconcentric surface 68 opposite the inlet port 75. When the tip of the forward vane passes the edge of the outlet port 76, a portion of the trapped fluid will be forced through the outlet port 76 as the rotor and vanes continue to rotate. An intermediate stage of this operation is illustrated in FIGURE 4 where it can be seen, as shown by arrows, that fluid is being forced through the outlet port 76 by a vane at the same time as an additional body of fluid is being drawn into the cavity and channel behind the vane by way of the inlet port 75. In this way fluid is continually drawn from the inlet duct system into the cavity and channel by way of the inlet port 75 and continually ported into the outlet duct system by way of the outlet port 76.

In similar fashion, and as the rotor and vane assemblage continue to rotate, an additional quantity of fluid will be drawn through the second inlet port 75 opposite the first into the corresponding vane cavity and channel and will be forced therefrom through the outlet port 76 opposite the first outlet port. It will be noted furthermore, that with each complete rotation of the rotor and vane assemblage with respect to the apertured member 66 eight separate bodies of hydraulic fluid will be conveyed from an inlet port to an outlet port. Since each body of fluid thus conveyed is essentially equal to the volume of the crescent shaped fluid-forwarding chamber 77 and is considerably greater than the body of fluid pumped during one rotation of a conventional gear pump of comparable size, it is clear that the capacity of the apparatus here described for circulating fluid at a given rotational speed of operation is much greater than that of the comparable gear pump. This is of considerable importance in that it furnishes a greater volume of circulating fluid and thus permits a much greater accuracy in controlling the proportion of the fluid which is allowed to flow through the duct system between the outlet and inlet ports. By the same token a greater rate of fluid flow permits the building of the apparatus with less accurate manufacturing tolerance.

Referring again to FIGURES 4 and 5 it will be noted that the sliding contact of the exterior cylindrical surface of the rotor 33 at all times provides a fluid tight seal with the concentric surface 67 betwen each outlet port and the inlet port ahead of it. There is thus little or no possibility of fluid leaking backward with respect to the direction of rotation of the rotor from one inlet port to the preceding outlet port with a consequent loss in inefficiency of the apparatus. It should also be pointed out that, as each vane travels between an outlet port and the inlet port next ahead of it, it is contained completely within its corresponding vane cavity. The hub of the vane may, for purposes of strength, be of sufficient diameter to pass near the concentric surface 67 but it should clear the surface by at least a small amount. It will be noted that, during this portion of the travel of the vane, the vane cavity on each side of the vane is completely filled with fluid and that this is carried as inventory from one forwarding cycle to the next. The two portions of the vane cavity lying between the two wings of a traveling vane and the adjacent concentric surface 67 are of constantly varying capacity as the vane continues to rotate within the vane cavity. The hub 74 should clear the concentric surface 67 by a distance sufficient to allow a free interchange of fluid between these two portions of the vane cavity.

It will also be observed, further, that the apparatus can be operated with equal effectiveness should the rotor 33, as illustrated in FIGURES 4 and 5, be caused to rotate in a clockwise rather than in a counter-clockwise direction. In this instance the inlet ports 75 become outlet ports and the outlet ports 76 become inlet ports. The direction of rotation of the driven assemblage is, of course, reversed. It will be noted that, regardless of the direction of rotation of the rotor with respect to the apertured member, the port in either nonconcentric arcuate surface encountered first by a rotor vane, and the part of the duct system extending between that port and the valve chamber, are referred to as the "inlet," or "first" port and the "inlet," or "first" duct system whereas the other port in the same nonconcentric arcuate surface, and the part of the duct system extending between it and the valve chamber, are referred to as the "outlet,' or "second" port and the "outlet," or "second" duct system.

The necessity of maintaining certain relationships between the dimensions of the parts for best results has been mentioned. Although it is believed that these are apparent from the description thus far given, certain of them may be mentioned again to advantage.

It will be clear that the capacity of the apparatus to circulate hydraulic fluid in the duct system will be related directly to the length of the rotor vanes measured from the center of one semi-cylindrical tip surface to the other along a line normal to and intersecting the axis of rotation of the vane. Thus, the longer the vane, the greater will be the capacity of its vane chamber 70, and of the crescent shaped channel 77, and, correspondingly, the volume of fluid circulated per unit time for a given rotational speed of the rotor 33 with respect to the apertured member. As mentioned previously an adequate provision for circulation of fluid is desirable.

The radius of the vane chamber, should, from an inspection of FIGURES 4 and 5, clearly be equal to one half the extreme length of the vane, i.e. to the distance from the axis of rotation of the vane to the center of one of its semi-cylindrical tip surfaces, and this distance should, in turn, be equal to the distance from the center of rotation of the vane to the midpoint of the nonconcentric arcuate surface 68 measured along a line intersecting the common axis of rotation of the rotor and of the apertured member. To insure continuous wiping of the nonconcentric arcuate surface 68 throughout its length by the vane tip, the radius of the surface 68 should be equal to the distance between the axis of rotation of the vane and the axis of rotation of the apertured member plus the vane tip radius. It should, of course, be located on a line connecting the midpoint of the surface 68 and the axis of rotation of the apertured member.

To provide for easy shifting of the valve body 88 in the valve chamber 84, a small drain duct 106 is drilled in the valve body to provide communication between the parts of the chamber on opposite sides of the body. The duct 86 permits free flow of fluid between valve chamber 84 and the interior cavity 107 of the apparatus. The latter cavity serves as a reservoir for hydraulic fluid, generally a lubricating oil, for the introduction of which a convenient and conventional filler plug 108 can be provided in the wall of the rotor housing 4.

The end plate gear 58, the idler gear 28 and the rotor vane gear 7 have been referred to previously. The relationship and manner of cooperation of these gears is shown in FIGURE 6. As noted previously, the end plate gear 58 is secured, as by a key 10, to the intermediate section 83 of the hub 79 and rotates therewith. The gear 58 meshes with a pair of oppositely located idler gears 28 mounted on the idler gear bolts 35, suitably by way of antifriction bearings 27, the bolts having been described previously. Each idler gear 28 lies between and meshes on opposite of its sides with a pair of rotor vane gears 7, each of which is secured, as by a key 54, to its respective rotor vane shaft 72, there being four rotor vane gears and shafts in the modification illustrated. The gear 58 and the four gears 7 have the same number of teeth and each idler gear conveniently has the same number of teeth as the other. It will thus be seen that any rotation of either the rotor frame 5, on which the vane shafts 72 are mounted, or the intermediate sections 83 of the hub 79 with respect to one another will cause each of the four shafts 72 to rotate in their bearings at the same rate and in the same direction. Furthermore, the rates of rotation of the shafts 72 will be at the same rate and in the same direction as those of the end plate gear 58, i.e. in the same direction and at the same angular rate as the apertured member 66. Under such conditions, and with each rotor vane 2 originally assembled with is cross sectional axis, i.e. its axis which passes through the vane tip radii normal to its longitudinal axis, extending parallel with a line passing through the radial centers of the two nonconcentric surfaces 68, this same relationship will be preserved regardless of the rotations of the driving assemblage and of the driven assemblage with respect to one another, and the proper wiping action of the vane tips on the surfaces 68 and 69 mentioned previously will be effected.

The adjustment of the valve body 88 in the valve chamber to regulate the rotational speed of the driven assemblage can be effected in any convenient manner either manually or automatically, as desired. In a preferred modification the valve stem 92 can be provided with a grooved collar mounted rotatably thereon to avoid rotational contact of the valve body 88 and the wall of the valve chamber 84. One suitable grooved collar illustrated in FIGURE 3 comprises a rear retainer plate 20 and a front retainer plate 15 secured together with retainer screws 16 and mounted rotatably on the valve stem by way of ball bearings 17. The peripheries of the facing surfaces of the retainer plates are cut away to form a retainer plate channel or groove 109 around the collar. A suitable valve adjusting member 110 can be positioned to ride in the channel 109 and connected to, and manipulated manually by, suitable lever means, not shown, to effect retraction and advancement of the valve body 88. The lever means can, of course, be mounted on a support separate from the rest of the power transmitting device.

In the modification illustrated in FIGURES 1, 2 and 3, means are provided for controlling the location of the valve body 88 in the valve chamber 84 automatically to cause the driven assemblage to rotate at constant predetermined speed. In this modification the outer end of the hub 79 protrudes outwardly of the end plate 24 and is threaded externally to receive an internally threaded control collar 111 which is secured in place as by a control collar set screw 112. Opposed pairs of angularly extending regulator supporting arms 113 are secured, as by control support screws 114, to flat surfaces formed on the sides of the collar 111. Alternatively the collar 111 and the arms 113 can be formed, e.g. by casting, integral with one another. Each pair of supporting arms 113 provides a mounting for a fly weight pivot pin 14 which extends between the arms and serves as a pivot for a fly weight mounted thereon, each fly weight comprising a pair of angular arms to the end of one of which a valve adjusting member 110 is secured and to the end of the other of which is secured a suitably heavy weight 115. Rotation of the driven assemblage, including the collar 111 and arms 113, causes the fly weights to rotate on the pivot pins 14 by the action of centrifugal force on the weights until further rotation is prevented by the increased tension on the valve spring 25. When this stage is reached, the driven assemblage will continue to rotate at constant speed, the actual value of which will depend upon the presetting of the valve adjusting screw 18. Other suitable means for controlling the output speed of the power transmitting device can be employed.

It will be appreciated that when the apparatus described is operated with the fluid-restricting valve partly or completely open, a number of instances occur where one surface slides on or wipes another surface. The wiping of the arcuate surfaces 69 and the nonconcentric arcuate surfaces 68 by the tips of the rotor vanes 2 has been noted. It will also be apparent that one end of each rotor vane wipes the face of the rotor frame 5 as it rotates while the other end of the vane wipes the wear plate 37. Also, one end of the rotor 33 is in sliding or wiping contact with the wear plate. Since the apparatus is normally operated using a hydraulic liquid, the manufacturing tolerances of the surfaces making such contacts need be only sufficient to insure a satisfactory hydraulic liquid seal. In fact, it is preferred that the sliding or wiping surfaces travel close to one another but that they avoid, insofar as is conveniently possible, any actual bearing on one another. This contributes to economy of manufacture of the apparatus and minimizes wear during its use.

It has been mentioned that a filler plug 108 is conveniently provided in the rotor housing by way of which hydraulic fluid can be introduced into the reservoir chamber 107. It is convenient to provide a suitable means, such as the check valve assemblage illustrated at 60 of FIGURE 3, for passage of fluid from the reservoir 107 into the inlet part of the duct system, this part of the system not ordinarily being under pressure. Once the reservoir 107 is filled with oil and the apparatus run slowly for a short time, especially with the fluid-restricting valve almost closed and with the apparatus under some load, any air enclosed in the vane chambers and duct systems will be displaced by hydraulic fluid drawn into the duct system through the check valve assemblage 60 and will find its way into the reservoir 107 from which it can be displaced by the addition of more fluid. This operation can be carried out more than once if necessary. The reservoir 107 is generally kept essentially full of hydraulic liquid, adequate room for thermal expansion of the liquid being, of course, provided.

To insure the best balancing of the apparatus it is usual practice to provide a separate check valve assemblage 60 communicating with the inlet part of the duct system leading to each vane chamber. The ducts 94 and 99 extending longitudinally of the rotor housing wall, shown clearly in FIGURE 6, are preferably located symmetrically around the wall to provide proper balancing of the housing. It should be noted, further, that the entire apparatus involves no reciprocating parts which travel at high speed and that each rotational part is easily adaptable to accurate balancing. The entire apparatus when carefully made runs smoothly and quietly and with a high degree of efficiency.

Certain modifications of the apparatus of the invention adapted particularly to use for purposes other than as a variable speed power transmitting device will now be described.

In the modification of FIGURE 8 the apertured member 66 is clamped between an outlet housing 116 and an inlet housing 117, e.g., by suitable bolts, not shown. The sub-assembly thus formed is mounted rigidly on suitable supports, e.g., as by brackets 147 on piers 146. The inlet housing 117 is provided with a threaded housing inlet port 118 and the outlet housing 116 is provided with a threaded housing outlet port 119 for connection to supply and delivery conduits, respectively. The ends of the aperture in the apertured member 66 are secured against leakage of fluid by a pair of seal plates 121 and 122 which are clasped tightly against the ends of the rotor 33 in sliding fluid-tight relationship with the ends of the apertured member 66 by suitably shouldered idler gear bolts 35 and bolts 30 so as to rotate with the rotor. It will be seen that using this modification a fluid can be pumped by way of the outlet port 119 to a desired location when the rotor is rotated in the proper direction, but that when the direction of rotation of the rotor is reversed, fluid will be drawn into the apparatus by way of the port 119 and delivered by way of the port 118, the apparatus thus being completely reversible.

In FIGURE 9 there is illustrated a modification having three fluid-forwarding chambers, or crescent shaped channels, 77, six rotor vane chambers 70, a triangular rotor vane 123 having three rotor vane tips 124 located in each rotor vane chamber. In this instance a particular vane tip of each vane wipes the same non-concentric arcuate surface once during each revolution of the apertured member 66, or of the rotor 33, with respect to the other.

In FIGURE 10 there is illustrated a modification having four fluid-forwarding chambers 77 and eight rotor vane chambers 70 with a square rotor vane 125 in each rotor vane chamber. Each rotor vane has four rotor vane tips 126. Here again a particular rotor vane tip of each rotor vane wipes the same non-concentric arcuate surface 66 during each revolution of the apertured member 66, or of the rotor 33 with respect to the other.

In the modification of FIGURE 11 the end plate gear, corresponding to the end plate gear 58 of FIGURE 3, is replaced with a cam eccentric 127 which is mounted rigidly, but off center, with respect to the apertured member shown in outline at 66. A cam plate 128 is mounted concentric with, and rotatably on, the eccentric. Each rotor vane chamber 70, shown mostly in dotted outline, contains a rotor vane which is provided with an offset drive pin 129 which is secured in rotatable fashion in the cam plate at a predetermined distance from its center. The parts are dimensional to insure that upon rotation of the apertured member, or of the rotor, not shown, with respect to the other, each rotor vane rotates in its respective rotor vane chamber at the required rate.

In the modification of FIGURE 12 a portion 130 of each nonconcentric arcuate surface 68 and a portion 135 of the wall 69 of each rotor vane chamber 70 is adjustable to permit controlled bypassing of fluid past the ends of the rotor vanes for regulating the relative rotational speeds of the apertured member 66 and the rotor 33. In this modification the portions 130 of the nonconcentric surfaces 68 are each formed on an apertured member insert 131 separate from the apertured member 66 but retained therein in suitable insert raceways 137. The inserts are adapted to be moved radially of the rotor 33 inwardly of the apparatus until the surface 130 is continuous with the surface 68 and is in a position to be wiped positively with the appropriate vane tip or to be moved radially of the rotor outwardly of the apparatus until the surface 130 clears the vane tip by a predetermined distance. In this latter position a part of the fluid flowing through the fluid-forwarding chamber 77 flows past the vane tip and the difference in relative rotational speeds of the apertured member and the rotor is increased. Although the adjustment of the members 131 can be effected in any appropriate manner, there are shown in the illustration adjusting bolts 132 running in threaded ports in the apertured member 66 which prevent the inserts 131 from moving too far outwardly in response to the pressure of fluid in the fluid-forwarding chamber 77. Suitable shoulders 133 can be provided to prevent the members 131 from moving so far inwardly that they will interfere with the proper movement of the rotor vanes 2.

Rotor insert members 134 can also be provided which travel radially of the rotor in rotor insert raceways 138 in the rotor 33. The outer end of each insert 134 is contoured to form a segment 135 of the arcuate surface 69 of the respective rotor vane chamber 70 extending through an arc of not more than 180 degrees. By retracting the inserts 134 inwardly of the rotor, bypassing of fluid between the arcuate surface 135 and the corresponding vane tip occurs. Suitable shoulders 136 can be provided to prevent the inserts 134 from moving outwardly far enough to interfere with the proper movement of the rotor vane. Control of the positions of the rotor inserts 134 in their raceways 138 can be effected in any convenient manner. In the illustration given, the member 140 represents a suitably mounted adjustable conical cam element coaxial with the rotor 33. By adjusting the cam element 130 longitudinally of the axis of the rotor, the rotor inserts 134, which ride on the cam surface, as at 148, are adjusted radially inward or outward of the rotor.

The positions of the inserts 131 and 134 when allowing no bypassing of fluid is shown clearly in FIGURE 12 in which the arcuate surfaces 130 and 135 of the inserts are shown in a position to be wiped positively by the vane tips. When, however, both inserts 131 and 134 are retracted in their respective directions so that the surfaces are cleared an appreciable distance by the vane tips, bypassing of fluid past them occurs. This condition is shown clearly in FIGURE 13 where the dimeter of the cam element 140 with respect to the dimensions of the other parts is seen to be less than in FIGURE 12, the tapered surface of the cam 140 being shown at 149. In practice either or both of the inserts can be retracted. In a further modification, not shown, a suitable fluid, such as an hydraulic liquid or, in some instances, a gas, can be admitted to the raceways 137 and 138 behind the inserts 131 and 134. By metering the amount of fluid admitted to each raceway the positions of the respective inserts can be adjusted and maintained constant. By arranging for the amount of metered fluid contained in the raceways to be inversely responsive to the rotational speed of one of the assemblages, the speed of that assemblage can be maintained essentially constant regardless of the speed of the other assemblage.

In FIGURE 14 there is illustrated a modification having a single rotor vane 2, a single rotor vane chamber or cavity 70 and a single fluid-forwarding chamber 77. In this instance suitable inlet and outlet check valves 139 and 141, respectively, are installed in the inlet and outlet duct systems 142 and 143, respectively, to restrict the flow of fluid in chamber 77 to one direction only, the rotation of the rotor 33 for the setting of the check valves shown being in the direction indicated by the arrow. In the event it is desired to forward fluid in the reverse direction, the check valves 139 and 141 are reversed and the rotor is rotated in the opposite direction from that shown, the duct system 143 then becoming the inlet duct system and the duct 142 becoming the outlet duct system. In the event a positive forward motion of fluid, followed by a return flow, is desired, the check valves 139 and 141 can be omitted.

Any suitable means, such as a gear train or a cam arrangement resembling those discussed previously, is provided, but not shown in FIGURE 14, to cause rotation of the rotor vane 2 in the rotor vane chamber 70 in the same direction and at the same rate at which the apertured member 66 rotates with respect to the rotor 33. Since in this instance, as well as in certain other instances, e.g. as in the modification of FIGURE 8, it is more convenient, to facilitate the connecting of fluid-conveying conduits to the inlet and outlet duct systems, to provide means to prevent any rotation of the apertured member, such as lugs 151 and bolts 152, it is sometimes more appropriate, but equivalent, to express the general relationship of the rotation of the parts by stating that the rotor vane 2 rotates in its chamber 70 at the same rate as, but in the reverse direction of, that of the rotor 33 with respect to the apertured member 66.

In FIGURE 14 it will be noted that when the rotor 33 is rotated through an angle of 180 degrees from its position illustrated, the rotor vane 2 will again be protruding beyond the circumference of the rotor 33. To provide room for clearance of the vane, a suitable clearance chamber 144 can be provided in the apertured member opposite the chamber 77 and dimensioned to prevent entirely any contact of the vane with the wall of the chamber. Under such circumstances, and with adequate dimensions of the clearance chamber, each rotation of the rotor forwards a precisely measured amount of fluid through outlet conduit 143 with no further forwarding of fluid until the next time the rotor vane enters the fluid-forwarding chamber 77. To avoid wastage of, or contamination of, the fluid being forwarded, the chamber 144 is closed and filled with the fluid being forwarded. With the chamber 144 in communication by way of a suitable pressure equalizing conduit 145 with the outlet conduit 143, leakage of fluid past the rotor from the fluid-forwarding chamber 77 into the clearance chamber 144 is minimized.

It will be apparent that the apparatus of FIGURE 14 is thus adapted to furnish a pulsed flow of fluid in the outlet conduit 143. It will be likewise apparent without further illustration that by providing a second rotor vane chamber and corresponding rotor vane in the rotor 33 opposite the chamber and vane illustrated, a pulsed flow of fluid can be produced to which the pulse rate is, for the same rate of rotation of the rotor, twice that produced with a single vane. Also by forming the clearance chamber 144 as an actual fluid-forwarding chamber opposite to, and with identical dimensions as, the chamber 77, the pulse rate can be doubled while still employing a single vane. It is, of course, understood that in this, as well as in other, modifications of the invention including a plurality of fluid-forwarding chambers, the inlet ports of all of the chambers are in many instances connected to the same inlet duct system and the outlet ports of all of the chambers are connected to the same duct system.

Multiple function effects can be obtained by constructing the apparatus with two or more apertured members as elements of the second assemblage and a corresponding number of rotors and associated parts as elements of the first assemblage and by arranging the duct systems to provide for one apertured member and the corresponding rotor and vane assemblage to perform one function while another apertured member and its associated rotor and vane assemblage is performing another function.

The foregoing remarks and an inspection of the drawing lead to certain conclusions concerning the preferred form of the invention when the apparatus is constructed to insure the rotation of the rotor vane in the rotor vane chambers in the same direction as, and at the same rate as, the relative rotation of the apertured member with respect to the rotor. Under such circumstances the number of vane tips on each rotor vane can with advantage be at least as great as, and preferably, except in the case of a single chamber, equal to, the number of fluid-forwarding chambers. It has been poined out that the nonconcentric surface of any particular fluid-forwarding chamber is ordinarily, and preferably wiped in turn by a particular tip of each succeeding vane and that this tip does not wipe the nonconcentric surface of any other fluid-forwarding chamber.

It should, however, be pointed out that this is not always necessarily the case. Thus, for example, the apparatus can comprise four fluid-forwarding chambers located symmetrically in the apertured member and eight rotor vanes in eight rotor vane chambers located symmetrically around the rotor, the rotor vane in each vane chamber having two diametrically opposed vane tips with the vane diameters extending between the tips of alternate vanes being located at right angles with respect to the vane diameters extending between the tips of the intervening vanes. In such instance the respective tips of alternate vanes wipe the nonconcentric arcuate surfaces of one pair of opposed fluid-forwarding chambers while back flow of fluid can occur in the other pair of opposed chambers. Subsequently, the respective tips of the intervening vanes wipe the nonconcentric arcuate surfaces of the other pair of opposed chambers while back flow of fluid through the first pair of chambers can occur. By the installation of suitable check valves, the back flow of fluid referred to can, of course, be prevented.

It is also pointed out that in the modification just referred to it is feasible to form one opposed pair of fluid-forwarding chambers and the appropriate set of vane chambers and rotor vanes with somewhat different dimensions than those of the other fluid-forwarding chambers, rotor vane chambers and rotor vanes. This provides for forwarding a fluid at one rate through one opposed pair of fluid-forwarding chambers and at a different rate through the other pair. This modification is useful for providing a pulsed continuous flow of fluid.

In another variation of the foregoing arrangement each rotor vane can be provided with four vane tips, rather than with two, located symmetrically around it, in which case a tip of each vane will wipe a particular nonconcentric arcuate surface. In this instance it will be noted that as one vane closes an inlet port and another vane begins to open an outlet port of the same fluid-forwarding chamber, an intervening vane midway between them will also be wiping the nonconcentric arcuate surface. This modification is of particular value when the apparatus is used to compress a gas since the presence of the intervening vane assists materially in preventing blow-by of gas past the vane tips.

When the use of check valves in the inlet and outlet duct systems to prevent back flow of fluid through the fluid-forwarding chambers is to be avoided, it is essential that the inlet port for each fluid-forwarding chamber be closed completely by an advancing rotor vane before the vane ahead of the advancing vane begins to open the outlet port for the same chamber. Thus, the radial angle between adjacent rotor vanes should in this instance not be greater than the radial angle between the edges nearest one another of the inlet and outlet ports for each fluid-conveying chamber, both angles being measured with the common axis of rotation of the rotor and of the apertured member as a center.

The apparatus of the invention has been described with particular reference to the nonconcentric arcuate surfaces as forming a part of the surface of the aperture of the apertured member in which case the inlet and outlet ports and the corresponding fluid-conveying duct systems are associated with the apertured member and the rotary vane chambers and rotor vanes are associated with the rotor. Although not illustrated in the drawing, it is also feasible, but not usually as convenient, to form the vane chambers in the apertured member and to form the nonconcentric surfaces as sections of the surface of the rotor. In such an instance the aperture of the apertured member is entirely cylindrical except where it is interrupted by openings to provide for the communication of the vane chambers with the fluid-forwarding chambers. The nonconcentric surfaces are formed on the rotor as arcs of greater radius than that of the rotor and intersect the cylindrical intermediate sections of the surface of the rotor at their ends, the crescent shape fluid-forwarding chambers being defined by the nonconcentric surfaces on the face of the rotor and the concentric surface of the aperture of the apertured member. The inlet and outlet ports are formed in the nonconcentric surfaces near their ends and the inlet and outlet fluid-conveying duct systems are formed, e.g. by drilling, within the body of the rotor. Communication of the fluid-conveying duct systems with conduits outside the apparatus can be by any suitable means, e.g. by way of a longitudinally drilled axial shaft and suitable outside connections. The means for rotating the rotor vanes in the rotor vane chambers, such as a set of meshing gears or a suitable cam arrangement, is, in this instance, arranged to cause each vane to rotate in its vane chamber in the same direction as, and at the same rate as, the relative rotation of the rotor with respect to the apertured member.

I claim:

1. In a fluid power apparatus comprising first and second assemblages of members, the combination including:

a stationary mounted apertured member of predetermined length associated with the second assemblage wherein the aperture is defined, in part, by at least one arcuate surface concentric with the axis of rotation of the apertured member, and in part, by at least one arcuate surface nonconcentric with the axis of rotation of the apertured member, the concentric and nonconcentric surfaces intercepting one another longitudinally of the aperture;

a first fluid-conveying duct system in the second assemblage communicating with a first fluid port located at least partially in one end of a nonconcentric arcuate surface adjacent to a concentric surface;

a second fluid-conveying duct system in the second assemblage communicating with a second fluid port located in the opposite end of the same nonconcentric surface adjacent to a concentric surface;

a rotor of generally cylindrical configuration associated with the first assemblage having a length essentially equal to that of the aperture of the apertured member and having a radius essentially equal to that of the concentric arcuate surface, the rotor being located within the aperture of the apertured member and being rotatable relative to the apertured member with its exterior surface in substantially fluid-tight relationship with the concentric arcuate surface, but spaced from the nonconcentric arcuate surface by a predetermined distance to define a fluid-forwarding chamber between the rotor and the nonconcentric arcuate surface;

a rotor vane chamber of incomplete cylindrical contour with a radius less than that of the rotor inset into the cylindrical surface of, and axially parallel with, the rotor with a side opening through the rotor surface facing the wall of the aperture in the apertured member;

a rotor vane having a length essentially equal to that of the aperture of the apertured member located rotatively in the rotor vane chamber with its rotational axis coincident with the radial center of the rotor vane chamber and formed with at least two vane tips each extending parallel with the rotational axis of the vane and distant therefrom by a distance essentially equal to the radius of the rotor vane chamber;

means to close both ends of the aperture of the apertured member to prevent essentially the flow of fluid from the ends of the aperture during rotation of the first assemblage with respect to the second assemblage;

and vane rotating means responsive to the rotation of the first assemblage with respect to the second assemblage to cause rotation of the rotor vane within the rotor vane chamber to cause one of its tips to wipe the surface of the rotor vane chamber, the parts being dimensioned to cause another of its tips to wipe simultaneously a nonconcentric arcuate surface.

2. Apparatus as claimed in claim 1 wherein the vane rotating means comprises a cam eccentric mounted rotatably off center on the second assemblage, a cam plate mounted concentric with, and rotatably on, the cam eccentric and an offset rotor vane pin associated with a rotor vane retained rotatably in a bearing in the cam plate at a predetermined distance from the center thereof.

3. Apparatus as claimed in claim 1 wherein the number of fluid-forwarding chambers, of rotor vane chambers and of rotor vanes is each one and the apertured member is formed with a clearance chamber opposite the fluid-forwarding chamber dimensioned to avoid contact at all times of the surface thereof with the rotor vane and wherein means is provided to rotate the first assemblage in a predetermined direction and separate means is provided to prevent rotation of the second assemblage.

4. Apparatus as claimed in claim 1 wherein the inlet and outlet fluid-conveying duct systems are each provided with a check valve to permit the flow of fluid through the fluid-forwarding chamber in only one predetermined direction.

5. Apparatus as claimed in claim 1 wherein a nonconcentric arcuate surface is formed at least partially on an apertured member insert retained in a raceway in the apertured member, the insert being adapted to travel in the raceway radially of the apertured member from a position where the part of the nonconcentric surface on the insert is wiped by a tip of a rotating rotor vane to a position where it is cleared by the rotor vane tip.

6. Apparatus as claimed in claim 1 wherein a portion of a surface of a rotor vane chamber extending through an arc not greater than 180 degrees is formed at least partially on a rotor insert retained in a raceway in the rotor, the insert being adapted to travel in the raceway radially of the rotor from a position where the part of the surface on the insert is wiped by a tip of a rotating rotor vane to a position where it is cleared by the rotor vane tip.

7. Apparatus as claimed in claim 1 wherein the second assemblage is adapted to be mounted in a stationary position, the first fluid-conveying duct system is adapted to be connected to a conduit for conveying fluid to the apparatus, the second duct system is adapted to be connected to a conduit for conveying fluid away from the apparatus and the first assemblage is adapted to be driven rotatably.

References Cited by the Examiner

UNITED STATES PATENTS

| 2,379,592 | 7/1945 | Philbrick | 192—58 |
| 2,816,637 | 12/1957 | Bucherer | 192—58 |
| 2,907,429 | 10/1959 | Selden | 192—58 |
| 2,939,560 | 6/1960 | Selden | 192—58 |

DAVID J. WILLIAMOWSKY, *Primary Examiner.*

FRED C. MATTERN, *Examiner.*

A. T. McKEON, *Assistant Examiner.*